US011112612B2

(12) United States Patent
Yoshida

(10) Patent No.: US 11,112,612 B2
(45) Date of Patent: Sep. 7, 2021

(54) HINGE MECHANISM AND HEAD-MOUNTED DISPLAY INCLUDING THIS HINGE MECHANISM

(71) Applicant: Sony Corporation, Tokyo (JP)

(72) Inventor: Takaaki Yoshida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/478,604

(22) PCT Filed: Nov. 20, 2017

(86) PCT No.: PCT/JP2017/041621
§ 371 (c)(1),
(2) Date: Jul. 17, 2019

(87) PCT Pub. No.: WO2018/139020
PCT Pub. Date: Aug. 2, 2018

(65) Prior Publication Data
US 2020/0050000 A1 Feb. 13, 2020

(30) Foreign Application Priority Data

Jan. 24, 2017 (JP) .............................. JP2017-010402

(51) Int. Cl.
*G06F 1/16* (2006.01)
*G02B 27/01* (2006.01)
(Continued)

(52) U.S. Cl.
CPC .......... *G02B 27/0176* (2013.01); *E05D 3/02* (2013.01); *E05D 11/0081* (2013.01);
(Continued)

(58) Field of Classification Search
None
See application file for complete search history.

(56) References Cited

U.S. PATENT DOCUMENTS 6,019,467 A 2/2000 Kawamoto
6,163,926 A * 12/2000 Watanabe ................ G02C 5/22
16/228

(Continued)

FOREIGN PATENT DOCUMENTS

JP 11-295663 A 10/1999
JP 2015-522842 A 8/2015

(Continued)

OTHER PUBLICATIONS

International Search Report and English translation thereof dated Feb. 13, 2018 in connection with International Application No. PCT/JP2017/041621.

*Primary Examiner* — Anthony Q Edwards
*Assistant Examiner* — Rashen E Morrison
(74) *Attorney, Agent, or Firm* — Wolf, Greenfield & Sacks, P.C.

(57) ABSTRACT

[Object] To provide a hinge mechanism that allows a head-mounted display to be made more compact, and a head-mounted display including this hinge mechanism.
[Solving Means] A hinge mechanism includes: a shaft portion; and a cable passing portion. The shaft portion supports a housing portion and a temple portion of the head-mounted display in such a way that the temple portion is capable of rotating about one axis between a closed position and an open position relative to the housing portion. The cable passing portion is adjacent to the shaft portion in a direction of the one axis, and allows a cable to pass therethrough in a direction orthogonal to the one axis.

9 Claims, 8 Drawing Sheets

(51) Int. Cl.
  *E05D 3/02* (2006.01)
  *E05D 11/00* (2006.01)
  *E05D 11/10* (2006.01)
(52) U.S. Cl.
  CPC ..... *E05D 11/1014* (2013.01); *E05Y 2900/606* (2013.01); *G02B 2027/0154* (2013.01); *G02B 2027/0178* (2013.01); *G06F 1/16* (2013.01)

(56) References Cited

U.S. PATENT DOCUMENTS

| | | | | |
|---|---|---|---|---|
| 2008/0013041 | A1* | 1/2008 | Chou | G02C 11/06 351/158 |
| 2009/0243964 | A1* | 10/2009 | Rottenkolber | G02B 27/0176 345/8 |
| 2012/0200477 | A1* | 8/2012 | Fujishiro | G02B 27/0172 345/8 |
| 2012/0200934 | A1* | 8/2012 | Fujishiro | G02B 27/0179 359/630 |
| 2013/0127980 | A1 | 5/2013 | Haddick et al. | |
| 2014/0028966 | A1* | 1/2014 | Blum | G02C 5/14 351/121 |
| 2016/0062125 | A1* | 3/2016 | Baek | G06F 1/163 361/679.01 |
| 2016/0212879 | A1* | 7/2016 | Nikkhoo | H05K 1/0201 |
| 2016/0266412 | A1* | 9/2016 | Yoshida | G02C 9/04 |
| 2017/0227779 | A1* | 8/2017 | Kato | H04N 5/64 |
| 2018/0052327 | A1* | 2/2018 | Kamakura | G02B 27/0103 |
| 2019/0369137 | A1* | 12/2019 | Naruse | G05D 1/0088 |

FOREIGN PATENT DOCUMENTS

| | | |
|---|---|---|
| JP | 2015-159381 A | 9/2015 |
| WO | WO 2013/049248 A2 | 4/2013 |
| WO | WO 2013/188805 A2 | 12/2013 |

\* cited by examiner

HINGE MECHANISM AND HEAD-MOUNTED DISPLAY INCLUDING THIS HINGE MECHANISM

CROSS-REFERENCE TO RELATED APPLICATIONS

The present application claims the benefit under 35 U.S.C. § 371 as a U.S. National Stage Entry of International Application No. PCT/JP2017/041621, filed in the Japanese Patent Office as a Receiving Office on Nov. 20, 2017, which claims priority to Japanese Patent Application Number JP2017-010402, filed in the Japanese Patent Office on Jan. 24, 2017, each of which is hereby incorporated by reference in its entirety.

TECHNICAL FIELD

The present invention relates to a hinge mechanism included in a head-mounted display, and a head-mounted display including this hinge mechanism.

BACKGROUND ART

In recent years, wearable devices have attracted attention as communication device terminals that function in a state of being worn on a body like clothes.

For example, Patent Literature 1 discloses a head-mounted wearable device (head-mounted display) that can be worn on a user's head, and can present an image to a part of the user's field of view by a display placed in front of the eyes.

CITATION LIST

Patent Literature

Patent Literature 1: Japanese Patent Application Laid-open No. 2015-159381

DISCLOSURE OF INVENTION

Technical Problem

Since the head-mounted display described in Patent Literature 1 include no hinge in the temple and a display unit that functions as a projector is provided inside the temple (on the side of the user's head), the temple cannot be folded and it is inferior in compactness.

In view of the circumstances as described above, it is an object of the present technology to provide a hinge mechanism that allows a head-mounted display to be made more compact, and a head-mounted display including this hinge mechanism.

Solution to Problem

In order to achieve the above-mentioned object, a hinge mechanism according to an embodiment of the present technology includes: a shaft portion; and a cable passing portion.

The shaft portion supports a housing portion and a temple portion of a head-mounted display in such a way that the temple portion is capable of rotating about one axis between a closed position and an open position relative to the housing portion.

The cable passing portion is adjacent to the shaft portion in a direction of the one axis, and allows a cable to pass therethrough in a direction orthogonal to the one axis.

With this configuration, the shaft portion that is the center of rotation of the temple portion is located immediately above the cable. As a result, the cable is prevented from becoming loose even if the temple portion is folded with respect to the housing portion. Therefore, since there is no need to take measures such as providing a housing portion for housing the loosed cable, the number of parts can be reduced and the head-mounted display can be made more compact.

The shaft portion may include first and second shaft portions facing each other in the direction of the one axis, and the cable passing portion may be provided between the first shaft portion and the second shaft portion.

The hinge mechanism may further include:

a restriction portion that restricts outward rotation of the temple portion at the open position about the one axis;

a slide mechanism that allows, where the temple portion is spread outward from the open position, a center portion of rotation of the temple portion around the one axis to move outward; and a biasing portion that generates a biasing force for biasing the center portion inward.

Since the hinge mechanism includes the slide mechanism, the temple portion can be further spread outward from the open position. Therefore, it is possible to further spread the opening/closing area of the temple portion.

The shaft portion may include a fixed portion fixed to the housing portion or the temple portion, and a pressure receiving portion that is to be biased by the biasing portion to generate a moment that suppresses inward rotation of the temple portion at the open position around the one axis.

As a result, it is possible to hold the temple portion at the open position. Therefore, when a user wears the head-mounted display, the temple portions do not get in the way and the attachment state in which it is easy for the user to wear it is maintained.

The biasing portion may include an elastic portion formed of an elastic body.

The elastic portion may be a torsion spring.

As a result, the hinge mechanism can be made compact with simple parts without increasing the number of parts, and it is possible to effectively use the space around the hinge mechanism.

The shaft portion may be formed of metal.

In order to achieve the above-mentioned object, a head-mounted display according to an embodiment of the present technology includes a housing portion; a temple portion; a shaft portion; and a cable.

The shaft portion supports the housing portion and the temple portion in such a way that the temple portion is capable of rotating about one axis between a closed position and an open position relative to the housing portion.

The cable passing portion is adjacent to the shaft portion in a direction of the one axis, and allows a cable to pass therethrough in a direction orthogonal to the one axis.

With this configuration, even if the temple portion is folded with respect to the housing portion, the wire length of the cable does not change. As a result, it is possible to cover the part of the cable exposed to the outside with a tube or the like. Therefore, it is possible to cause the routing portion of the cable to have a dustproof and waterproof structure, and the durability of the head-mounted display is improved.

The head-mounted display may further include
a power supply unit that is provided in the temple portion and connected to the cable.

As a result, since it is possible to cause the head-mounted display alone to have a complete configuration, the handling property of the head-mounted display is improved.

Advantageous Effects of Invention

It is possible to provide a hinge mechanism that allows a head-mounted display to be made more compact, and a head-mounted display including this hinge mechanism.

MODE(S) FOR CARRYING OUT THE INVENTION

Figure 1:
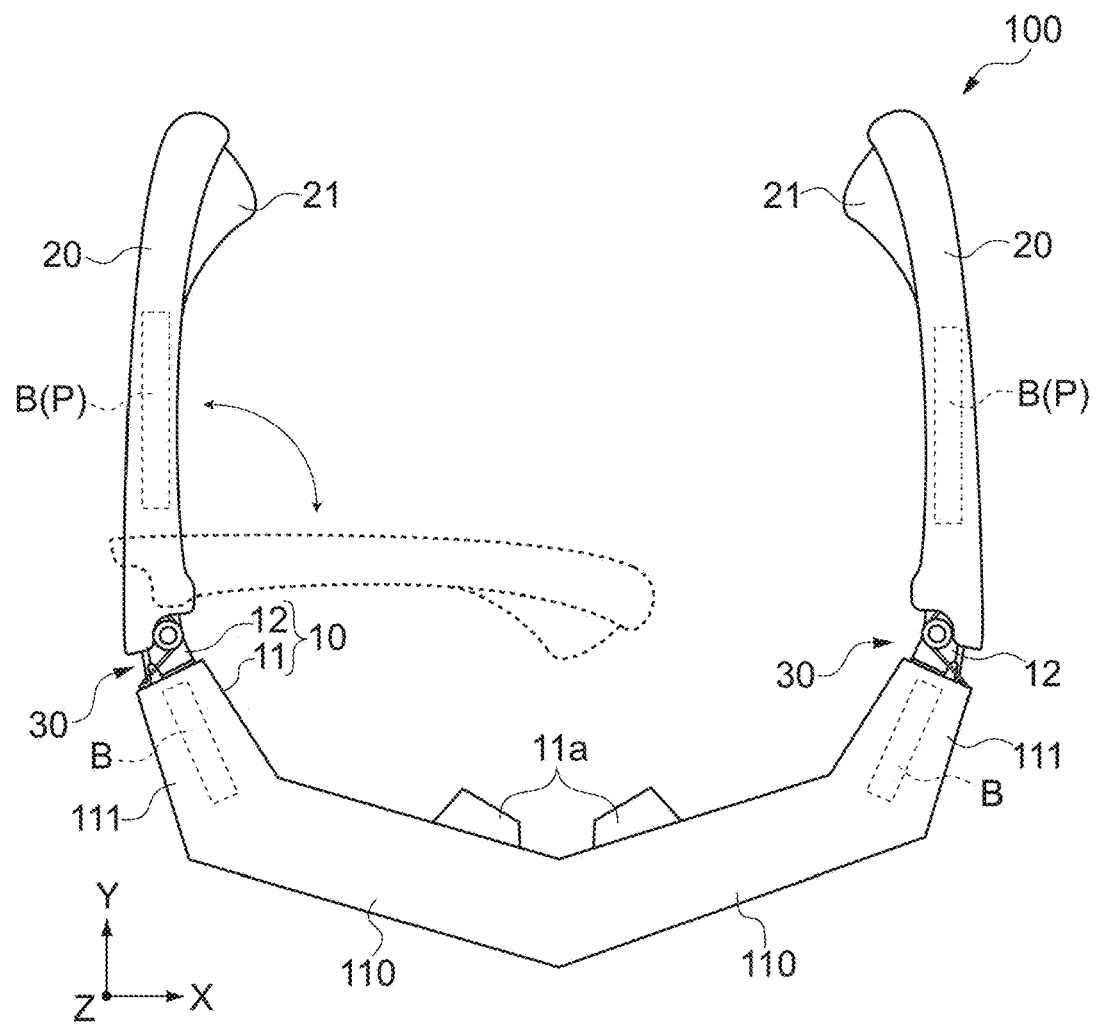
FIG. 1 is a plan view of a head-mounted display according to an embodiment of the present technology.

Hereinafter, an embodiment of the present technology will be described with reference to the drawings. In the drawings, an X axis, a Y axis, and a Z axis orthogonal to each other are shown. Not that the X axis, the Y axis, and the Y axis are common to each of the drawings.

[Configuration of Entire Head-Mounted Display 100]

Figure 2:
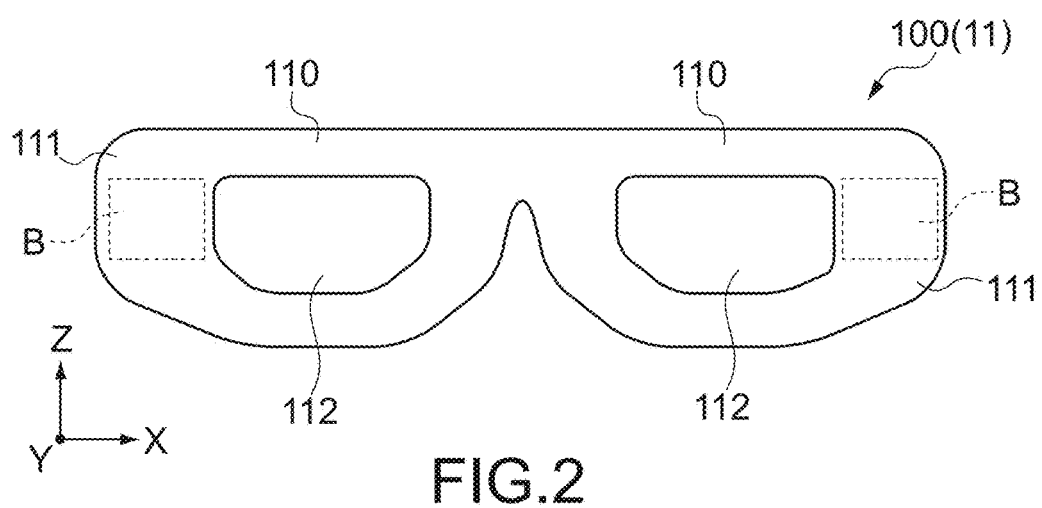
FIG. 2 is a front view of the head-mounted display.

FIG. 1 and FIG. 2 are each a schematic diagram showing a configuration of a head-mounted display 100 according to an embodiment of the present technology. FIG. 1 is a plan view of the head-mounted display 100, and FIG. 2 is a front view. Note that the configuration of the head-mounted display 100 according to this embodiment is not limited to the configuration shown in FIG. 1 and FIG. 2.

As shown in FIG. 1, the head-mounted display 100 includes housing portions 10, temple portions 20, and hinge mechanisms 30. The head-mounted display 100 is configured to be attachable/detachable to/from the user's head, similarly to the general glasses.

As shown in FIG. 1 and FIG. 2, the housing portions 10 each include a housing portion main body 11 and a base sheet metal 12. The base sheet metal 12 will be described later.

The housing portion main body 11 includes a rim portion 110, an end piece 111, and a display unit 112. The rim portion 110 is supported by the user's nose via a nose pad 11a provided to the housing portion main body 11, and faces the user's face. As shown in the figure, the end pieces 111 are disposed at both ends of the housing portion main body 11 in the X-axis direction, and integrated with the rim portion 110. In this embodiment, a control board B such as a printed circuit board is incorporated in the end piece 111.

The display units 112 are disposed at positions facing the user's eyes, and the periphery thereof is supported by the rim portion 110 as shown in FIG. 2. The display units 112 are each capable of causing visible light to be transmitted therethrough in the Y-axis direction (thickness direction of the display unit 112), and each have a so-called see-through configuration.

The temple portions 20 have a function of sandwiching the user's temporal regions from both sides in the X-axis direction by being supported by the user's ears. One end of each of the temple portions 20 is connected to the housing portion 10 via the hinge mechanism 30, and a cushion member 21 that protrudes in the direction in which the temple portion 20 is folded (hereinafter, inward) is provided to the other end as shown in FIG. 1.

By providing the cushion members 21 at the ends of the temple portions 20, it is possible to reduce the load given to the user when the user's temporal regions are sandwiched by the temple portions 20. As shown in FIG. 1, the control board B such a circuit printed board, a power supply unit P, and the like are incorporated into each of the temple portions 20 according to this embodiment.

The hinge mechanisms 30 each support the housing portion 10 and the temple portion 20. As shown in FIG. 1, the temple portion 20 is capable of rotating around the Z axis about the hinge mechanism 30 by being supported by the hinge mechanism 30. As a result, it is possible to fold the temple portions 20 with respect to the housing portions 10. The hinge mechanisms 30 will be described later.

[Configuration of Hinge Mechanism 30]

Figure 3:
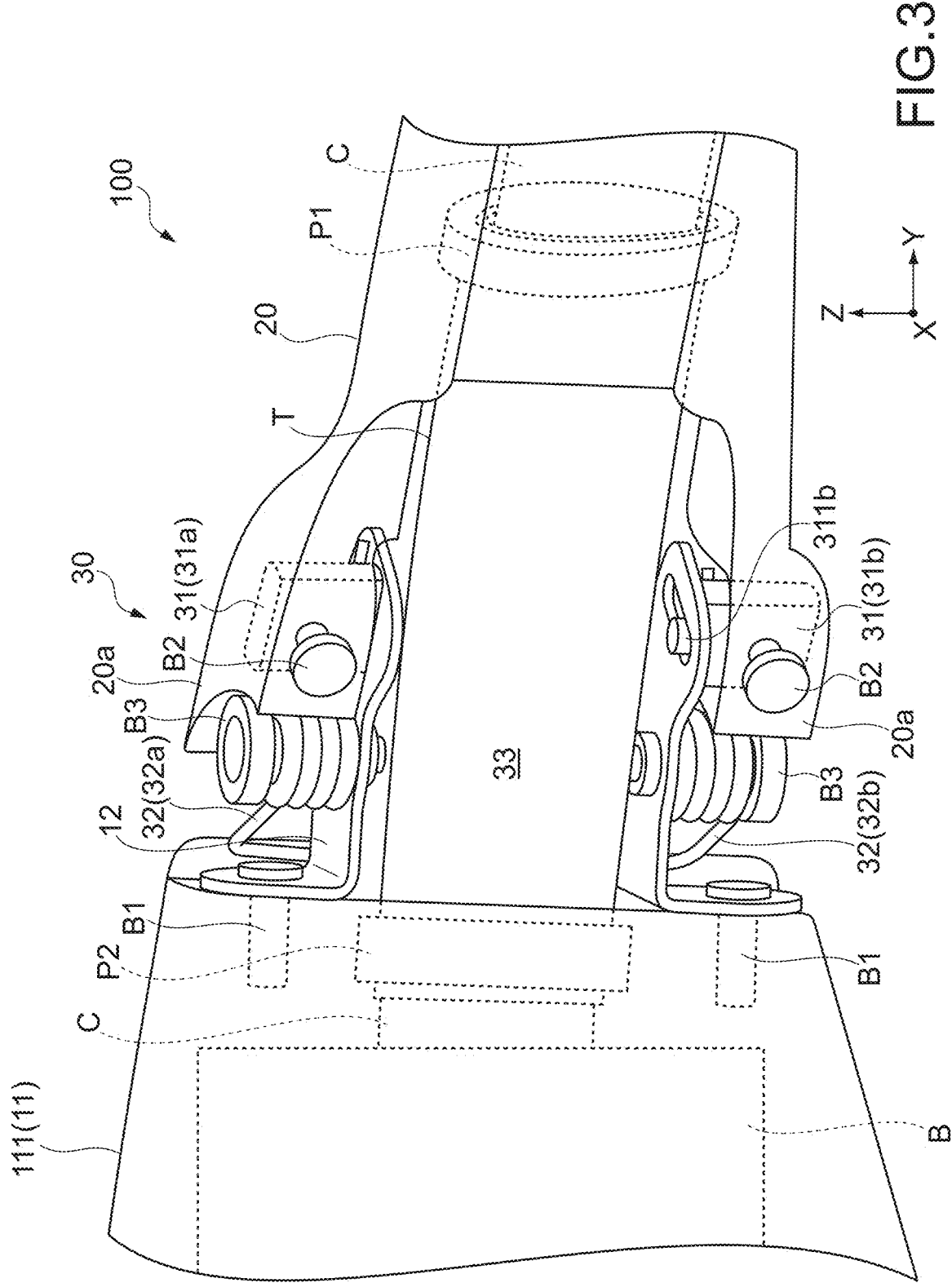
FIG. 3 is an enlarged view showing the vicinity of a hinge mechanism in the head-mounted display.
Figure 4:
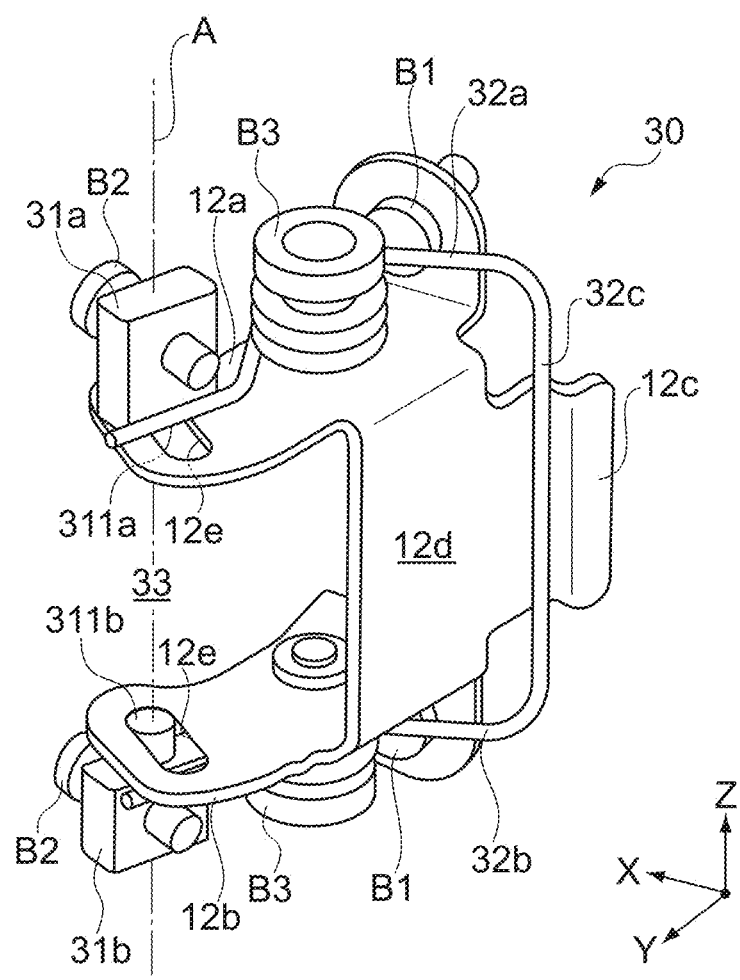
FIG. 4 is an enlarged perspective view of the hinge mechanism.

FIG. 3 is an enlarged view showing the vicinity of the hinge mechanism 30 in the head-mounted display 100. FIG. 4 is an enlarged perspective view of the hinge mechanism 30. Hereinafter, the detailed configuration of the hinge mechanism 30 will be described with reference to FIG. 3 and FIG. 4 as appropriate. Note that in FIG. 4, illustration of the housing portion main body 11 and the temple portion 20 will be omitted.

As shown in FIG. 3 and FIG. 4, the hinge mechanism 30 includes a shaft portion 31, a biasing portion 32, and a cable passing portion 33. As shown in the figure, the shaft portion 31 is formed to have flat columnar shapes in which a pair of long sides opposed to each other form a straight line, and includes a first shaft portion 31a and a second shaft portion 31b.

The first and second shaft portions 31a and 31b are separated from each other in the Z-axis direction via the cable passing portion 33, and support the base sheet metal 12 being a part of the housing portion 10.

As shown in FIG. 4, the base sheet metal 12 includes a first L-shaped portion 12a, a second L-shaped portion 12b, a crank-shaped bent portion 12c that protrudes in the Y-axis direction, and a connection portion 12d integrally connected to them.

As shown in FIG. 4, the first and second L-shaped portions 12a and 12b are separated from each other in the Z-axis direction via the cable passing portion 33. Further, one end of each of the first and second L-shaped portions 12a and 12b parallel to the Z-axis direction is fixed to the end piece 111 with a screw B1, and a flat guide portion 12e (slide mechanism) that penetrates the respective first and second L-shaped portions 12a and 12b is formed at the other end.

The bent portion 12c is embedded in the end piece 111, and functions as a lock receiving portion of a connection portion 32c that connects first and second torsion springs 32a and 32b as shown in FIG. 4. The end portion of each of the first and second L-shaped portions 12a and 12b is fixed to the end piece 111 with the screw B1 and the bent portion 12c is embedded in the end piece 111, thereby the base sheet metal 12 according to this embodiment is configured to be supported by the bent portion 12c.

Further, as shown in FIG. 3, each of the first and second shaft portions 31a and 31b is fixed to an end portion 20a of the temple portion 20 with a screw B2. The first and second shaft portions 31a and 31b are stepped shaft, and each include a first fixed portion 311a and a second fixed portion 311b provided integrally.

As shown in FIG. 3 and FIG. 4, the first and second fixed portions 311a and 311b are each formed to have a cylindrical shape. In this embodiment, by inserting each of the first and second fixed portions 311a and 311b into the guide portion 12e provided to the base sheet metal 12, the first and second shaft portions 31a and 31b are rotatably fixed to the first and second L-shaped portions 12a and 12b, respectively, around the Z axis.

The material forming the shaft portion 31 is not particularly limited. For example, it is a synthetic resin or a metal material. In this embodiment, it is favorable that the shaft portion 31 is formed of metal from the viewpoint of improving the durability of the hinge mechanism 30.

The biasing portion 32 has a configuration in which two elastic portions each formed of an elastic body are connected by the connection portion 32c. Specifically, the biasing portion 32 is a double torsion spring including the first and second torsion springs 32a and 32b and the connection portion 32c connecting them.

By forming the biasing portion 32 as a double torsion spring, it is possible to case the shaft portion 31 to stably rotate with uniform rotational torque. Further, by forming the biasing portion 32 as a double torsion spring, it can be made compact with simple parts without increasing the number of parts of the hinge mechanisms 30, and it is possible to effectively use the space around the hinge mechanism 30.

As shown in FIG. 3 and FIG. 4, the first and second torsion springs 32a and 32b are respectively attached to the first and second L-shaped portions 12a and 12b via screws B3 via a spacer (not shown) so as to be rotatable around the Z axis.

Here, in the biasing portion 32, the connection portion 32c connecting the first and second torsion springs 32a and 32b is locked to the bent portion 12c of the base sheet metal 12 as shown in FIG. 4, thereby restricting the rotation in the direction in which the temple portions 20 are spread (hereinafter, outward). As a result, the first and second torsion springs 32a and 32b always bias the first and second shaft portions 31a and 31b inward, respectively.

Although the biasing portion 32 according to this embodiment is a double torsion spring as shown in FIG. 4, it is not limited thereto, and may be, for example, a double torsion coil spring or a plate spring. Also the material of the biasing portion 32 is not particularly limited, and may be, for example, piano wire, hard steel wire, or stainless steel.

The cable passing portion 33 is a space provided between the first shaft portion 31a and the second shaft portion 31b via the first and second L-shaped portions 12a and 12b as shown in FIG. 4, and is a space for causing a cable C that electrically connects the control board B incorporated in the housing portion main body 11 and the power supply unit P or the control board B incorporated in the temple portion 20 to pass therethrough. In this embodiment, as the cable C as described above, two flexible cables and five to six cable harnesses pass through the cable passing portion 33.

Further, the cable passing portion 33 is adjacent to the first and second shaft portions 31a and 31b (first and second fixed portions 311a and 311b) in the Z-axis direction, and includes a space positioned on the same axis as a rotation axis A that is the rotation center of the first and second fixed portions 311a and 311b. As a result, the cable C passes through the cable passing portion 33 in the direction orthogonal to the rotation axis A.

[Operation of Temple Portion 20]

FIGS. 5 to 9 are each an enlarged view of the vicinity of the hinge mechanism 30 in the head-mounted display 100, and are each a diagram showing the operation of the temple portion 20. Note that in FIGS. 5 to 8, illustration of the housing portion main body 11 is omitted.

The head-mounted display 100 according to this embodiment is configured so that the temple portions 20 can be folded with respect to the housing portion main body 11 as described above (see FIG. 1).

Figure 5:
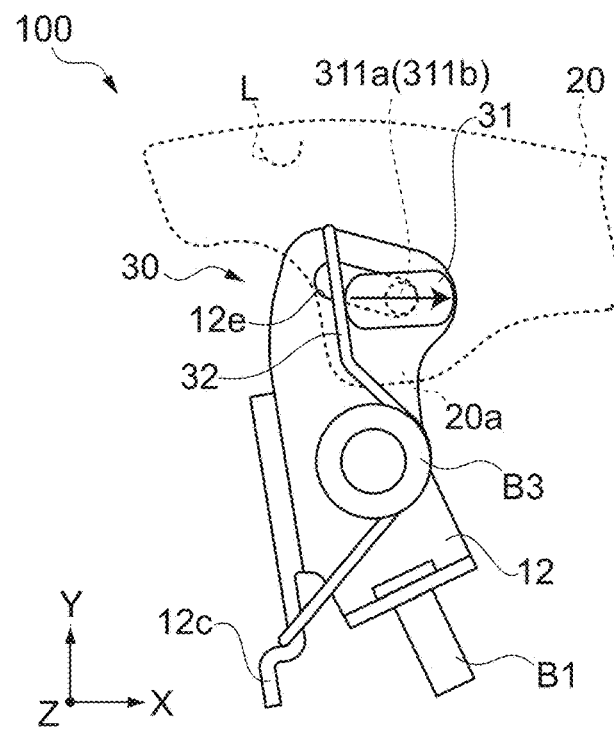
FIG. 5 is a diagram showing an operation of a temple portion of the head-mounted display.

Here, in the state where the temple portion 20 is at the closed position, as shown in FIG. 5, the shaft portion 31 fixed to the temple portion 20 is biased inward by the biasing portion 32. As a result, as shown in the figure, the fixed portion 311a (fixed portion 311b) integrally formed with the shaft portion 31 is pressed to the innermost side of the guide portion 12e, and the closed position of the temple portion 20 is held.

Next, when the temple portion 20 is spread outward from the closed position, the shaft portion 31 rotates about the fixed portion 311a (fixed portion 311b) around the Z axis while being biased inward by the biasing portion 32 until a rib portion L (restriction portion) that is provided on the inner wall surface of the temple portion 20 and protrudes toward the base sheet metal 12 is brought into contact with the base sheet metal 12. As a result, the position of the temple portion 20 moves from the closed position to the open position shown in FIG. 6.

Note that the above-mentioned "closed position" is a position of the temple portion 20 (L0 in FIG. 9) in the state where the temple portion 20 is folded with respect to the housing portion 10. Further, the above-mentioned "open position" is a position of the temple portion 20 (L1 in FIG. 9) in the state where the temple portion 20 is spread most by only rotation about the Z axis around the shaft portion 31. The "closed position" and the "open position" in the following description are also synonymous.

Figure 6:
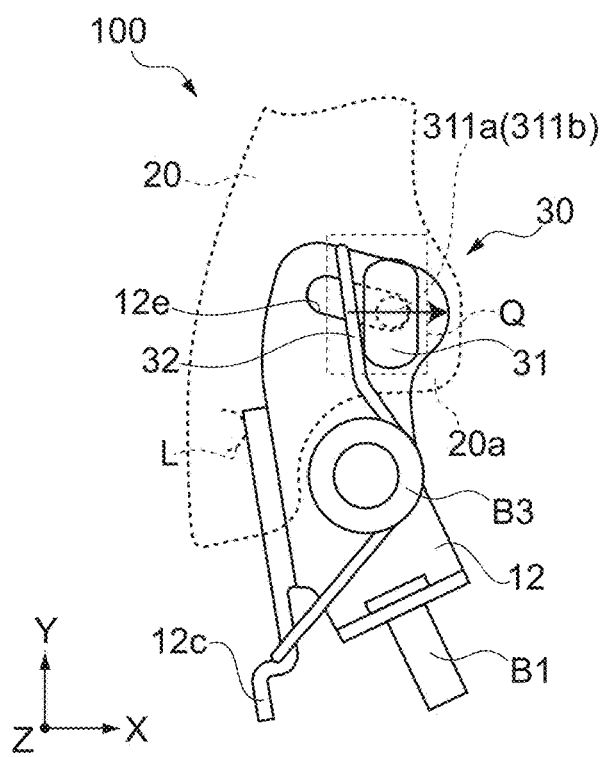
FIG. 6 is a diagram showing the operation of the temple portion of the head-mounted display.
Figure 7:
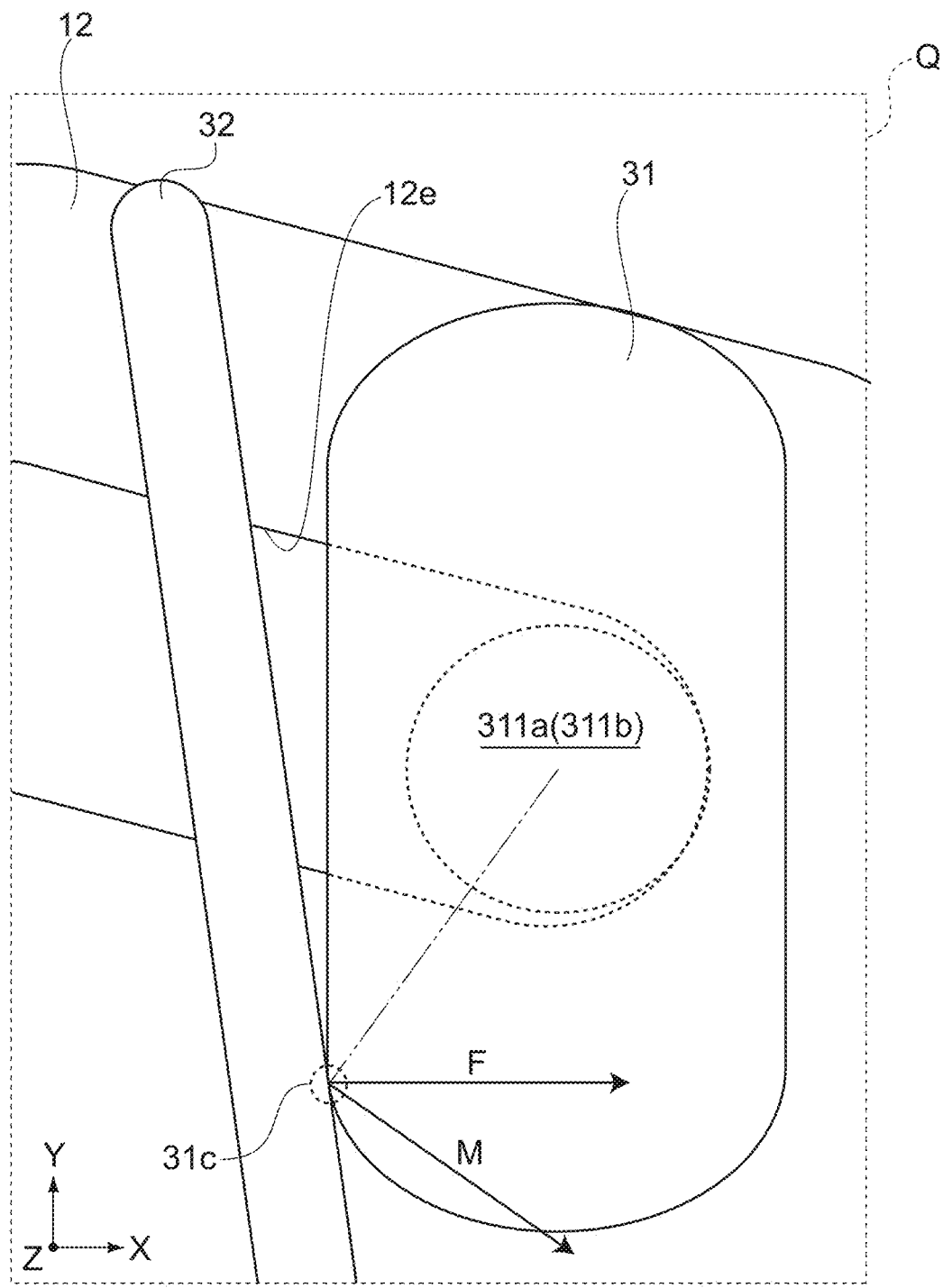
FIG. 7 is a schematic enlarged view showing an area Q of the hinge mechanism shown in FIG. 6.

FIG. 7 a schematic enlarged view showing an area Q shown in FIG. 6. In this embodiment, when the temple portion 20 is at the open position, a biasing force F is applied inward from the biasing portion 32 to a pressure receiving portion 31c of the shaft portion 31, which is a contact point between the biasing portion 32 and the shaft portion 31. As a result, a moment M for causing the shaft portion 31 to rotate around the Z axis is generated in the pressure receiving portion 31c, which suppresses the inward rotation of the temple portions 20 at the open position around the fixed portion 311a (fixed portion 311b).

Further, at the open position of the temple portion 20, as shown in FIG. 6, the rib portion L of the temple portion 20 is in contact with the base sheet metal 12, thereby regulating also the outward rotation of the temple portion 20 at the open position.

That is, in the hinge mechanism 30, the moment M is generated in the pressure receiving portion 31c of the shaft portion 31 and the rib portion L is in contact with the base sheet metal 12, thereby suppressing the inward and outward rotation of the temple portion 20 around the fixed portion 311a (fixed portion 311b). Therefore, the temple portion 20 is held at the open position. As a result, when a user wears the head-mounted display 100, the temple portions 20 do not get in the way and the attachment state in which it is easy for the user to wear it is maintained.

Figure 8:
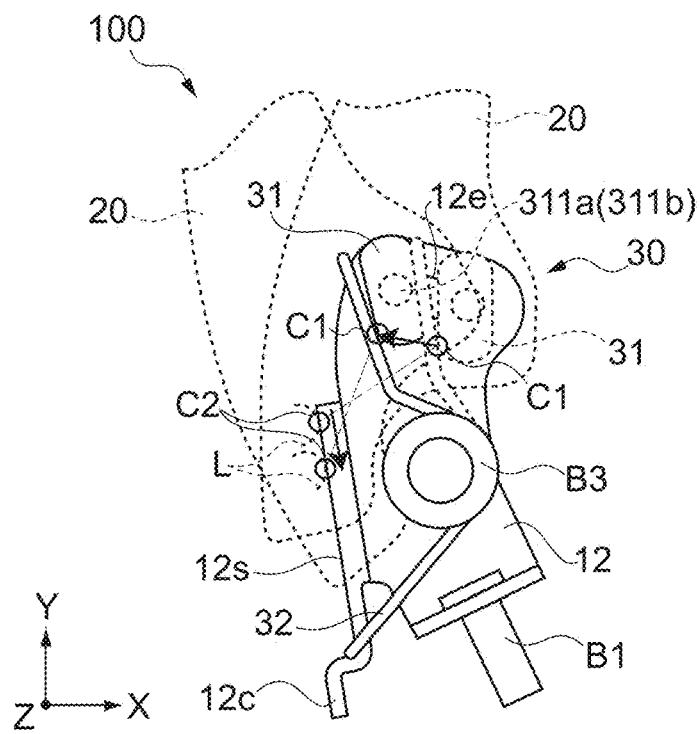
FIG. 8 is a diagram showing the operation of the temple portion of the head-mounted display.

Next, when an external force is applied outward to the temple portion 20 at the open position, as shown in FIG. 8, the shaft portion 31 slides outward along the guide portion 12e while being biased inward by the biasing portion 32. At this time, as shown in the figure, a contact point C1 (the pressure receiving portion 31c) between the shaft portion 31 and the biasing portion 32 moves outward, and a contact point C2 between the rib portion L and the base sheet metal 12 slides on a side surface 12s of the base sheet metal 12 toward the bent portion 12c.

That is, in the hinge mechanism 30 according to this embodiment, the contact point C1 moves outward and the contact point C2 slides on the side surface 12s toward the bent portion 12c, thereby causing the temple portion 20 to slide outward.

As a result, the center portion (the shaft portion 31) of the rotation of the temple portion 20 around the Z axis moves outward, and the temple portion 20 can be further spread outward from the open position. Therefore, it is possible to further spread the opening/closing area of the temple portion 20.

Note that in this embodiment, another mechanism that causes the temple portion 20 at the open position to rotate further outward may be arbitrarily adopted.

Figure 9:
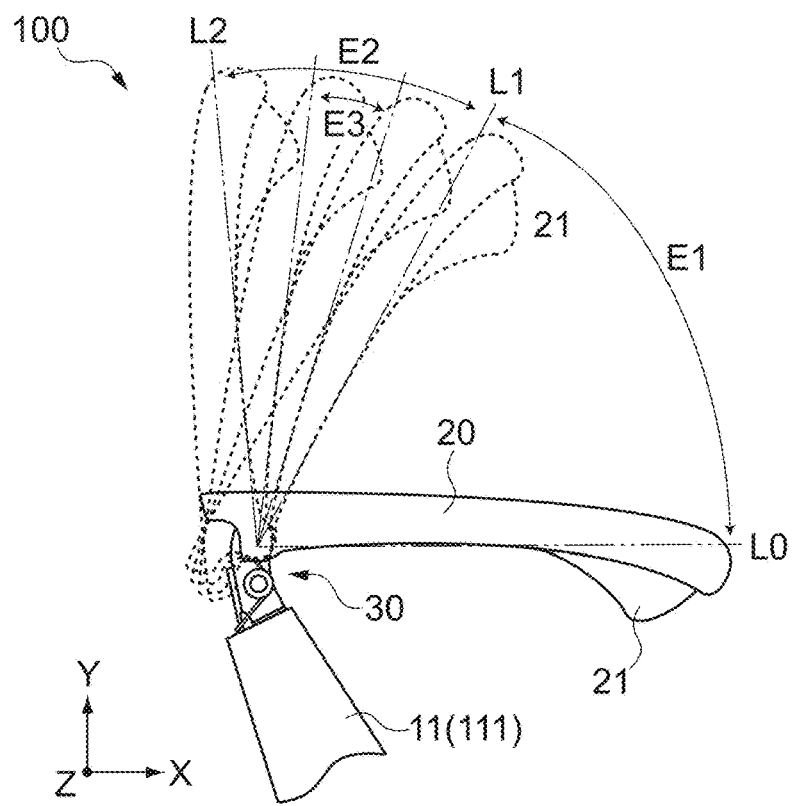
FIG. 9 is a diagram showing the operation of the temple portion of the head-mounted display.

FIG. 9 is a diagram showing the state in which the temple portion 20 is further spread outward from the closed position, and is a diagram showing the movable range of the temple portion 20.

Here, E1 shown in FIG. 9 indicates the movable range of the temple portion 20 from a closed position L0 to an open position L1, and E2 indicates the movable range of the temple portion 20 by the outward sliding of the shaft portion 31. Further, E3 indicates an assumed movable range of the temple portion 20 when a user wears the head-mounted display 100.

The temple portion 20 according to this embodiment slides, when being further spread outward from the open position L1, outward while being biased inward by the biasing portion 32. Here, in the head-mounted display 100 according to this embodiment, the movable range E2 is set to be larger than the assumed movable range E3 as shown in FIG. 9.

As a result, when a user wears the head-mounted display 100, the biasing portion 32 always biases the temple portion 20 so as to fit the user's temporal region. Therefore, it is possible to improve the fitting property of the head-mounted display 100 without depending on the size of the user's head.

In particular, in this embodiment, the pressing force with which the temple portion 20 presses the user's temporal region when the user wears the head-mounted display 100 falls within the range of approximately 0.7 N to 1.0 N. As a result, the head-mounted display 100 does not slip off in the case where the size of the user's head is small, and it is possible to reduce the load given to the user in the case where the size of the user's head is large.

[Operation of Hinge Mechanism 30]

Figure 10:
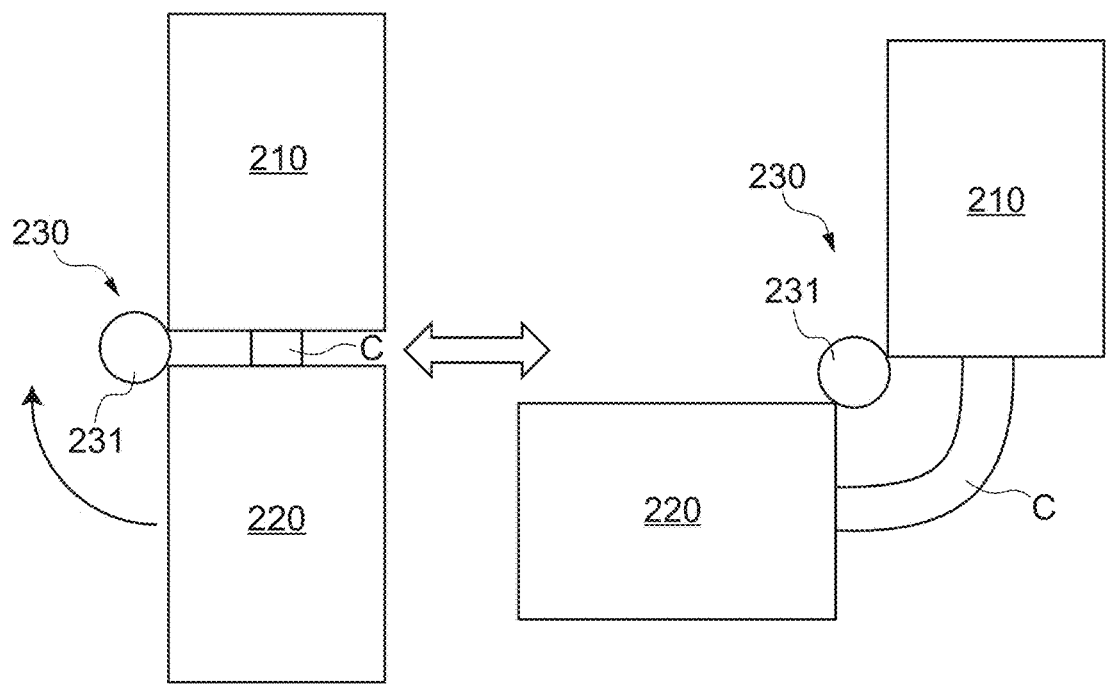
FIG. 10 is a conceptual diagram showing the opening/closing operation of a temple portion in an existing hinge mechanism.
Figure 11:
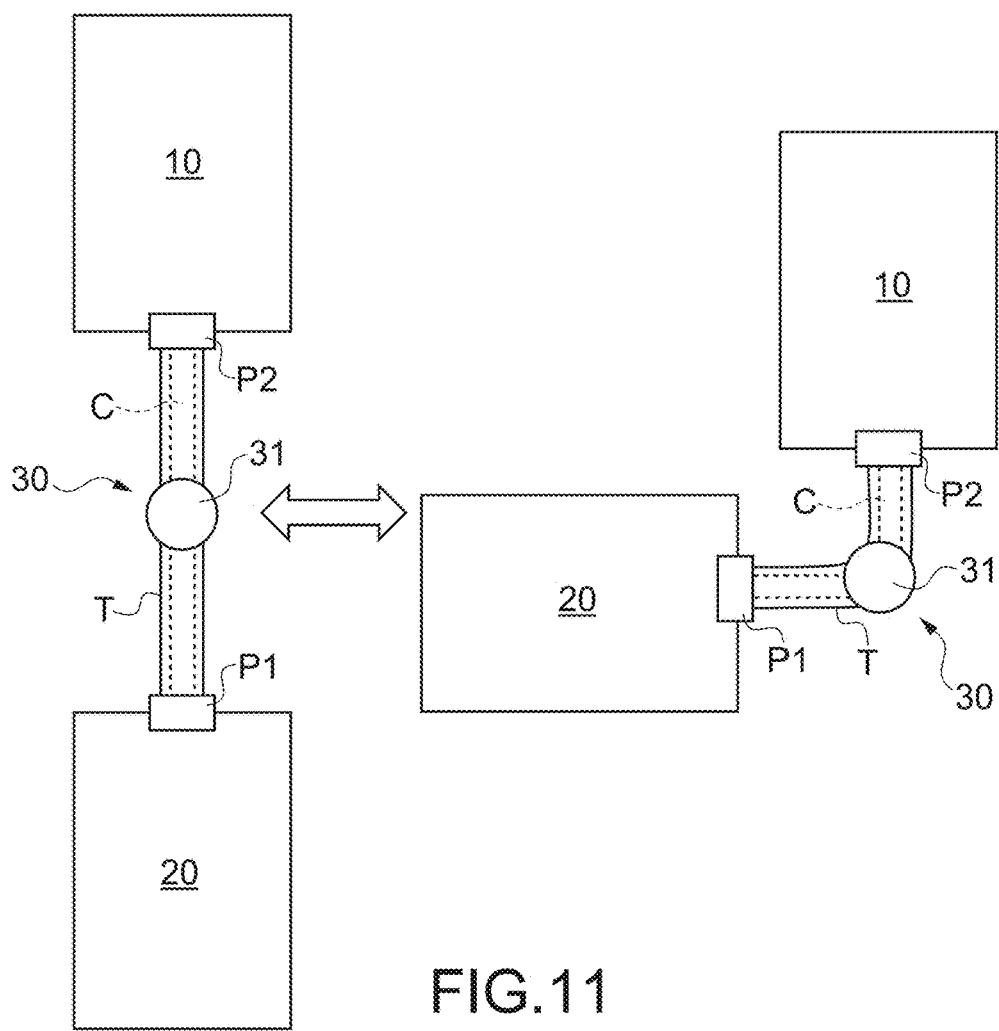
FIG. 11 is a conceptual diagram showing the opening/closing operation of the temple portion in the hinge mechanism according to an embodiment of the present technology.

FIG. 10 is a conceptual diagram showing the opening/closing operation of a temple portion 220 in an existing hinge mechanism 230. FIG. 11 is a conceptual diagram showing the opening/closing operation of the temple portion 20 in the hinge mechanism 30 according to this embodiment. Hereinafter, the operation of the hinge mechanism 30 will be described with reference to FIG. 10 and FIG. 11 as appropriate.

In the existing hinge mechanism 230, as shown in FIG. 10, a shaft portion 231 that is the center of inward rotation of the temple portion 220 is provided inside the cable C that electrically connects a housing portion 210 and the temple portion 220.

As a result, when the temple portion 220 rotates inward with respect to the housing portion 210, as shown in FIG. 10, the length of the part of the cable C exposed to the outside is prolonged, and the cable becomes loose in some cases. Therefore, the existing head-mounted display has a disadvantage that the number of parts increases because it is necessary to provide a housing portion or the like in the temple portion 220 to house the loosed cable C.

Meanwhile, the hinge mechanisms 30 according to this embodiment has a configuration in which the shaft portion 31 that is the center of inward rotation of the temple portion 20 is located immediately above the cable C as shown in FIG. 11. As a result, as shown in the figure, even if the temple portion 20 is folded with respect to the housing portion 10, the length of the part of the cable C exposed to the outside does not change.

Therefore, in the head-mounted display 100, as shown in FIG. 3 and FIG. 11, it is possible to cover the part of the cable C exposed to the outside with a tube T or the like. Therefore, the routing portion of the cable C that connects the control board B in the housing portion main body 11 and the control board B or the power supply unit P in the temple portion 20 has a dustproof and waterproof structure, and the durability of the head-mounted display 100 is improved.

Further, the head-mounted display 100 has a configuration in which the cable C does not become loose because the wire length of the cable C does not change even if the temple portion 20 is folded with respect to the housing portion 10. As a result, since there is no need to take measures such as providing a housing portion for housing the loosed cable C, the number of parts can be reduced and the head-mounted display 100 can be made more compact.

Note that in the head-mounted display 100 according to this embodiment, as shown in FIG. 3 and FIG. 11, gaps between both ends of the tube T and the housing portion main body 11 and the temple portion 20 are sealed with packings P1 and P2. The type of the packings P1 and P2 is not particularly limited. For example, a double-sided pressure-sensitive adhesive sheet or the like can be used.

[Modified Example]

Although an embodiment of the present technology has been described, it goes without saying that the present technology is not limited to only the above-mentioned embodiment and various modifications can be added.

For example, in the hinge mechanism 30 according to the above-mentioned embodiment, the shaft portion 31 adjacent to the cable passing portion 33 includes the first and second shaft portions 31a and 31b as shown in FIG. 4. However, the present technology is not limited thereto. That is, the shaft portion 31 may be singular as long as it is adjacent to the cable passing portion 33 in the one axis direction.

Further, in the hinge mechanism 30 according to the above-mentioned embodiment, the angles of the first shaft portion 31a and the second shaft portion 31b with respect to the biasing portion 32 are the same. However, the present technology is not limited thereto. Specifically, the first and second shaft portions 31a and 31b may have a configuration in which one of the shaft portions hold the closed position (see FIG. 5) and the other of the shaft portions hold the open position (see FIG. 6) in the case where the temple portion 20 is at the open position or the closed position.

Further, the head-mounted display 100 according to the above-mentioned embodiment has a configuration in which the guide portion 12e is provided to the housing portion 10 and the first and second fixed portions 311a and 311b pass through the guide portion 12e to be fixed to the housing portion 10. However, the present technology is not limited thereto.

For example, the head-mounted display 100 may have a configuration in which the guide portion 12e is provided to the temple portion 20 and the first and second fixed portions 311a and 311b pass through the guide portion 12e to be fixed to the temple portion 20.

In addition, although the rib portion L functions as a restriction portion that regulates outward rotation of the temple portion 20 at the open position in the hinge mechanism 30 according to the above-mentioned embodiment, the present technology is not limited thereto. That is, the hinge mechanism 30 may have a configuration in which the temple portion 20 at the open position arbitrarily includes a restriction portion that regulates further outward spread of the temple portion 20.

Figure 12:
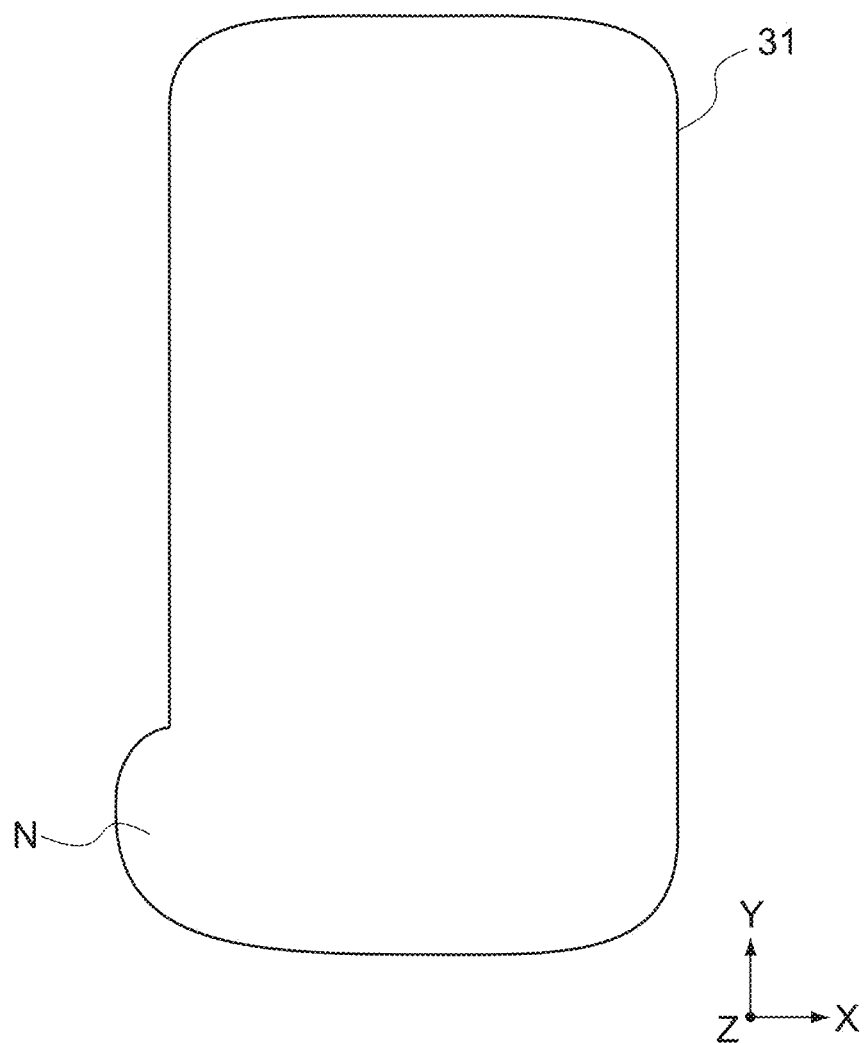
FIG. 12 is a schematic diagram showing a configuration of a shaft portion according to a modified example of the present technology.

FIG. 12 is a schematic diagram showing a configuration of the shaft portion 31 according to a modified example of the present technology. The shape of the shaft portion 31 is not limited to the flat shape in which in which a pair of long sides opposed to each other form a straight line as shown in FIG. 3 to FIG. 8. For example, the shaft portion 31 may have a shape having a projection portion N as shown in FIG. 12, a curved shape, or the like.

It should be noted that the present technology may take the following configurations.

(1)
A hinge mechanism, including:
a shaft portion that supports a housing portion and a temple portion of a head-mounted display in such a way that the temple portion is capable of rotating about one axis between a closed position and an open position relative to the housing portion; and
a cable passing portion that is adjacent to the shaft portion in a direction of the one axis, and allows a cable to pass therethrough in a direction orthogonal to the one axis.

(2)
The hinge mechanism according to (1) above, in which
the shaft portion includes first and second shaft portions facing each other in the direction of the one axis, and
the cable passing portion is provided between the first shaft portion and the second shaft portion.

(3)
The hinge mechanism according to (1) or (2) above, further including:
a restriction portion that restricts outward rotation of the temple portion at the open position about the one axis;
a slide mechanism that allows, where the temple portion is spread outward from the open position, a center portion of rotation of the temple portion around the one axis to move outward; and
a biasing portion that generates a biasing force for biasing the center portion inward.

(4)
The hinge mechanism according to (3) above, in which the shaft portion includes
a fixed portion fixed to the housing portion or the temple portion, and
a pressure receiving portion that is to be biased by the biasing portion to generate a moment that suppresses inward rotation of the temple portion at the open position around the one axis.

(5)
The hinge mechanism according to (3) or (4) above, in which
the biasing portion includes an elastic portion formed of an elastic body.

(6)
The hinge mechanism according to (5) above, in which the elastic portion is a torsion spring.

(7)
The hinge mechanism according to any one of (1) to (6) above, in which
the shaft portion is formed of metal.

(8)
A head-mounted display, including:
a housing portion;
a temple portion;
a shaft portion that supports the housing portion and the temple portion in such a way that the temple portion is capable of rotating about one axis between a closed position and an open position relative to the housing portion; and
a cable passing portion that is adjacent to the shaft portion in a direction of the one axis, and allows a cable to pass therethrough in a direction orthogonal to the one axis.

(9)
The head-mounted display according to (8) above, further including
a power supply unit that is provided in the temple portion and connected to the cable.

REFERENCE SIGNS LIST

100 head-mounted display
10 housing portion
20 temple portion
30 hinge mechanism
31 shaft portion
32 biasing portion
33 cable passing portion
C cable

The invention claimed is:

1. A hinge mechanism, comprising:
a shaft portion that supports a housing portion and a temple portion of a head-mounted display in such a way that the temple portion is capable of rotating about one axis between a closed position and an open position relative to the housing portion, wherein the shaft portion includes first and second shaft portions that are symmetrical to each other across an axis orthogonal to the one axis; and
a cable passing portion that is adjacent to the shaft portion in a direction of the one axis, and allows a cable to pass therethrough in a direction orthogonal to the one axis.

2. The hinge mechanism according to claim 1, wherein the cable passing portion is provided between the first shaft portion and the second shaft portion.

3. The hinge mechanism according to claim 1, further comprising:
   a restriction portion that restricts outward rotation of the temple portion at the open position about the one axis;
   a slide mechanism that allows, where the temple portion is spread outward from the open position, a center portion of rotation of the temple portion around the one axis to move outward; and
   a biasing portion that generates a biasing force for biasing the center portion inward.

4. The hinge mechanism according to claim 3, wherein the shaft portion includes
   a fixed portion fixed to the housing portion or the temple portion, and
   a pressure receiving portion that is to be biased by the biasing portion to generate a moment that suppresses inward rotation of the temple portion at the open position around the one axis.

5. The hinge mechanism according to claim 3, wherein the biasing portion includes an elastic portion formed of an elastic body.

6. The hinge mechanism according to claim 5, wherein the elastic portion is a torsion spring.

7. The hinge mechanism according to claim 1, wherein the shaft portion is formed of metal.

8. A head-mounted display, comprising:
   a housing portion;
   a temple portion;
   a shaft portion that supports the housing portion and the temple portion in such a way that the temple portion is capable of rotating about one axis between a closed position and an open position relative to the housing portion, wherein the shaft portion includes first and second shaft portions that are symmetrical to each other across an axis orthogonal to the one axis; and
   a cable passing portion that is adjacent to the shaft portion in a direction of the one axis, and allows a cable to pass therethrough in a direction orthogonal to the one axis.

9. The head-mounted display according to claim 8, further comprising
   a power supply unit that is provided in the temple portion and connected to the cable.

\* \* \* \* \*